(12) United States Patent
Minagawa et al.

(10) Patent No.: US 8,275,792 B2
(45) Date of Patent: Sep. 25, 2012

(54) DOCUMENT TYPE IDENTIFYING METHOD AND DOCUMENT TYPE IDENTIFYING APPARATUS

(75) Inventors: Akihiro Minagawa, Kawasaki (JP); Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/585,155

(22) Filed: Sep. 4, 2009

(65) Prior Publication Data

US 2010/0005096 A1 Jan. 7, 2010

Related U.S. Application Data

(63) Continuation of application No. PCT/JP2007/054576, filed on Mar. 8, 2007.

(51) Int. Cl.
*G06F 17/30* (2006.01)
(52) U.S. Cl. ...................................... 707/791
(58) Field of Classification Search .............. 707/755, 707/791, 793, 802–803
See application file for complete search history.

(56) References Cited

U.S. PATENT DOCUMENTS

| | | | |
|---|---|---|---|
| 6,963,665 B1 * | 11/2005 | Imaizumi et al. | 382/181 |
| 2007/0168382 A1 * | 7/2007 | Tillberg et al. | 707/102 |
| 2008/0025618 A1 | 1/2008 | Minagawa et al. | |

FOREIGN PATENT DOCUMENTS

| | | |
|---|---|---|
| JP | 06-259468 | 9/1994 |
| JP | 06-309394 | 11/1994 |
| JP | 07-134720 | 5/1995 |
| JP | 2000-285190 | 10/2000 |
| JP | 2000-348142 | 12/2000 |
| JP | 2001-202466 | 7/2001 |
| JP | 2008-33830 | 2/2008 |

OTHER PUBLICATIONS

International Search Report for PCT/JP2007/054576, mailed Apr. 17, 2007.

* cited by examiner

*Primary Examiner* — Thu-Nguyet Le
(74) *Attorney, Agent, or Firm* — Staas & Halsey LLP

(57) ABSTRACT

A document type identifying apparatus includes in advance a database storing therein keywords used as keys that identify document types in association with each document type. The document type identifying apparatus aligns word strings written on a document and generates partial keyword strings for each keyword by using the keywords stored in the database. The partial keyword strings are to be checked for matching with the word strings written on the document. Then, the document type identifying apparatus checks matching of the grouped and aligned word strings with the partial keyword strings and obtains, for each keyword, each number of matched words with the highest matching rates between the grouped word strings that are successfully matched and the partial keyword strings. Then, each number of matched words is used to calculate each evaluation value to determine the document type.

18 Claims, 19 Drawing Sheets

FIG.2

| KEYWORD | CARD APPLICATION FORM (n=3) | | CARD | APPLICATION | FORM |
|---|---|---|---|---|---|
| | | | 1 | 1 | 1 |
| TWO-WORD PARTIAL KEYWORD STRINGS (m=2) | | | CORRESPONDING BINARY EXPRESSION | | |
| 0 | CARD | FORM | 1 | 0 | 1 |
| 1 | CARD APPLICATION | | 1 | 1 | 0 |
| 2 | APPLICATION FORM | | 0 | 1 | 1 |

TWO BITS OUT OF THREE BITS CORRESPOND TO PARTIAL KEYWORD STRING

FIG.4

| DOCUMENT TYPE | KEYWORD |
|---|---|
| PACKING LIST FORM | PACKING LIST FORM |
| PACKING LIST FORM | DELIVERY DATE |
| PACKING LIST FORM | TOTAL AMOUNT |
| | |
| | |
| LIST OF QUOTATION | LIST OF QUOTATION |
| LIST OF QUOTATION | PERIOD OF VALIDITY |
| LIST OF QUOTATION | TOTAL AMOUNT |
| | |
| | |
| CARD APPLICATION FORM | CARD APPLICATION FORM |
| CARD APPLICATION FORM | APPLICANT NAME |
| CARD APPLICATION FORM | PHONE NUMBER |

FIG.5

A CARD APPLICATION FORM

APPLICATION DATE: JAN. 1, 2006

APPLICANT NAME FUJI, TARO

ADDRESS
(WITH APARTMENT NUMBER, IF APPLICABLE)

1-1-1XXX, YY, ZZZ

TEL  123-456-7890      e-mail  xx@xxx.xx.xx

FIRST GROUP: "A" "CARD" "APPLICATION" "FORM"
SECOND GROUP: "APPLICATION" "DATE" ":" "JAN." "1," "2" "0" "0" "6"
THIRD GROUP: "APPLICANT" "NAME" "FUJI," "TARO"
FOURTH GROUP:
"ADDRESS" "(" "WITH" "APARTMENT" "NUMBER," "IF" "APPLICABLE" ")"
FIFTH GROUP: "1" "-" "1" "-" "1" "XXX, " "YY," "ZZZ"
SIXTH GROUP: "TEL" "1" "2" "3" "-" "4" "5" "6" "-" "7" "8" "9" "0"
SEVENTH GROUP: "e-mail" "xx" "@" "xxx" "." "xx" "." "xx"

FIG.6

CARD APPLICATION

ADD "APPLICATION" TO "CARD"

CARD APPLICATION FORM

ADD "FORM" TO "CARD APPLICATION"

FIG.7
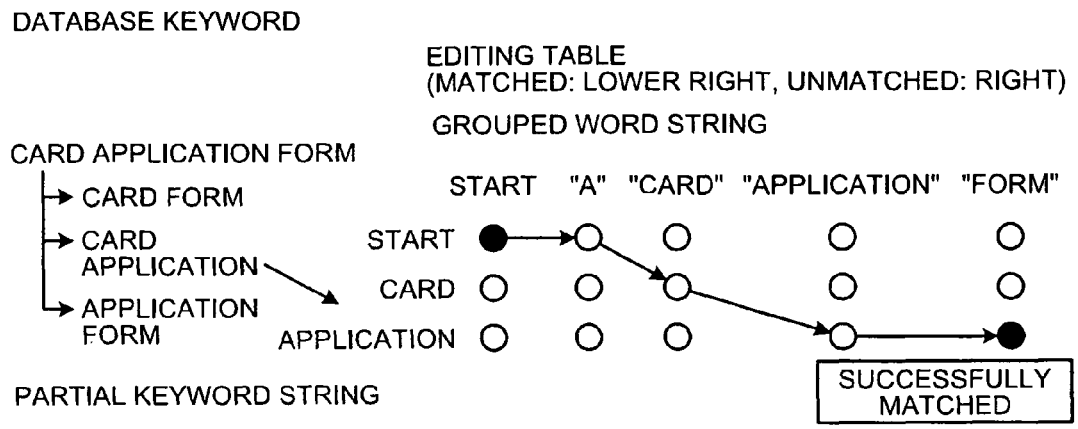
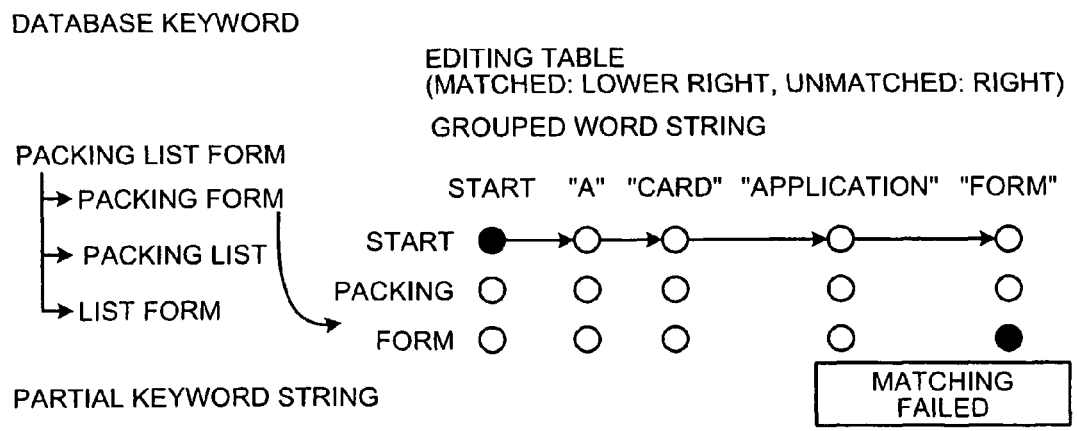

FIG.11

|     | n'=1 | n'=2 | n'=3 | n'=4 | n'=5 | n'=6 | ... | n' |
| --- | --- | --- | --- | --- | --- | --- | --- | --- |
| m=1 | 1 | 2 | 3 | 4 | 5 | 6 |  | $_{n'}C_m$ |
| m=2 | 0 | 1 | 3 | 6 | 10 | 15 |  |  |
| m=3 | 0 | 0 | 1 | 4 | 10 | 20 |  |  |
| m=4 | 0 | 0 | 0 | 1 | 5 | 15 |  |  |

FIG.12

DOCUMENT TYPE: "CARD APPLICATION FORM"
(DOCUMENT TYPE THRESHOLD→EVALUATION VALUE 66%)

· KEYWORD: "CARD APPLICATION FORM"
(GENERATED PARTIAL KEYWORD STRING: "CARD APPLICATION", "APPLICATION FORM", "CARD FORM")
MATCHING RESULT WITH GROUPED WORD STRING "CARD APPLICATION FORM"
→NUMBER OF MATCHED WORDS=3

∶

· KEYWORD: "NAME"
↑ ∶
· KEYWORD: "ADDRESS"

"DATE OF BIRTH"

EVALUATION VALUE
(TOTAL NUMBER OF MATCHED WORDS/TOTAL NUMBER OF WORDS CONTAINED IN KEYWORD)
=80%

DOCUMENT TYPE: "PACKING LIST FORM"
(DOCUMENT TYPE THRESHOLD→EVALUATION VALUE 66%)

· KEYWORD: "PACKING LIST FORM"
(GENERATED PARTIAL KEYWORD STRING: "PACKING LIST", "LIST FORM", "PACKING FORM")
MATCHING RESULT WITH GROUPED WORD STRING "CARD APPLICATION FORM"
→NUMBER OF MATCHED WORDS=0

∶

"NAME"
↑ ∶
"ADDRESS"

"DATE OF BIRTH"

EVALUATION VALUE=30%

⋮

EXEMPLARY OUTPUT OF DOCUMENT TYPE

FIRST ORDER: CARD APPLICATION FORM
SECOND ORDER: ⋯

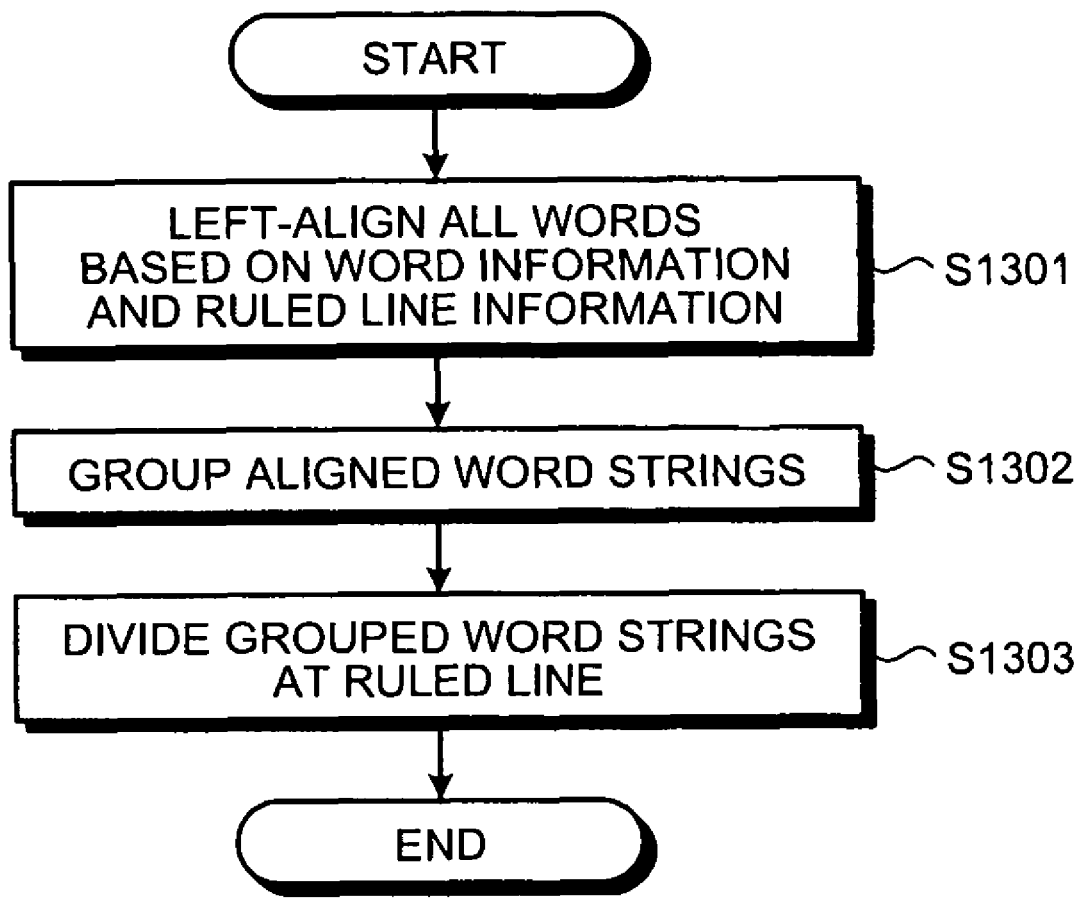

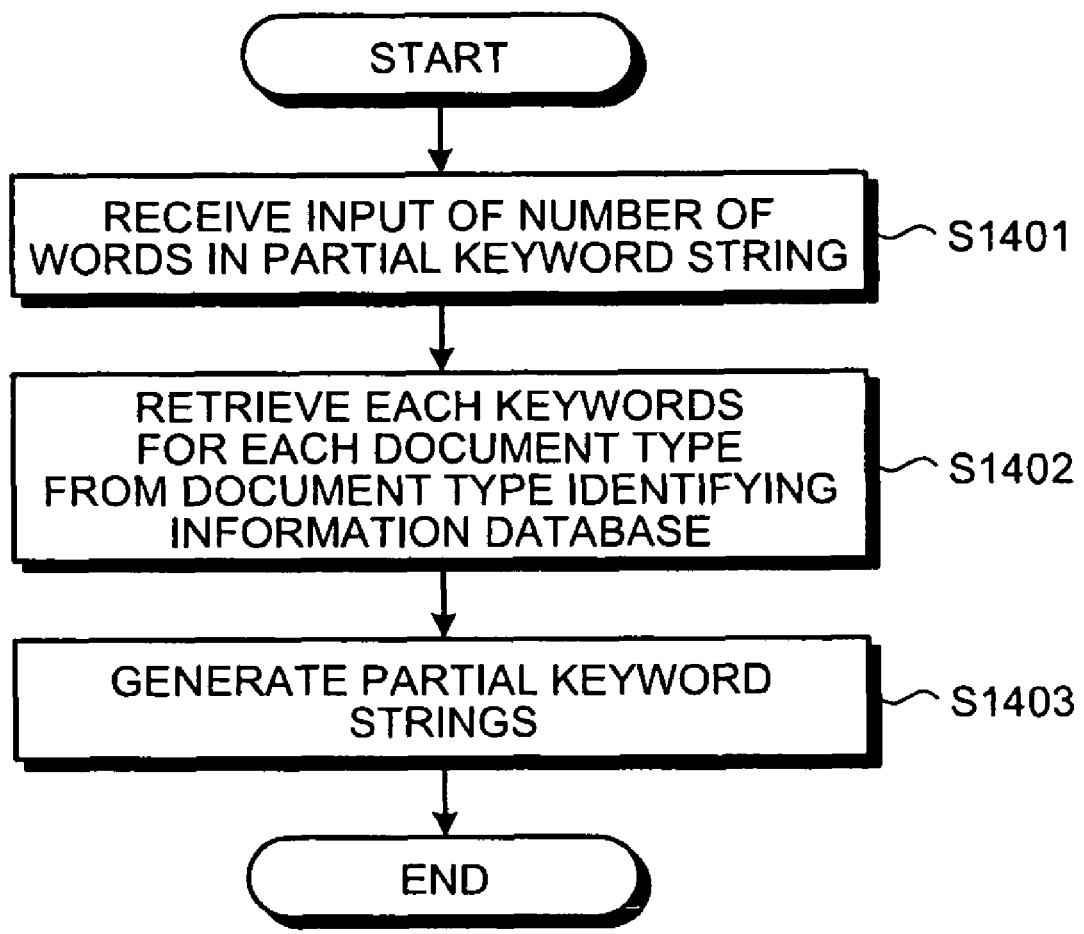

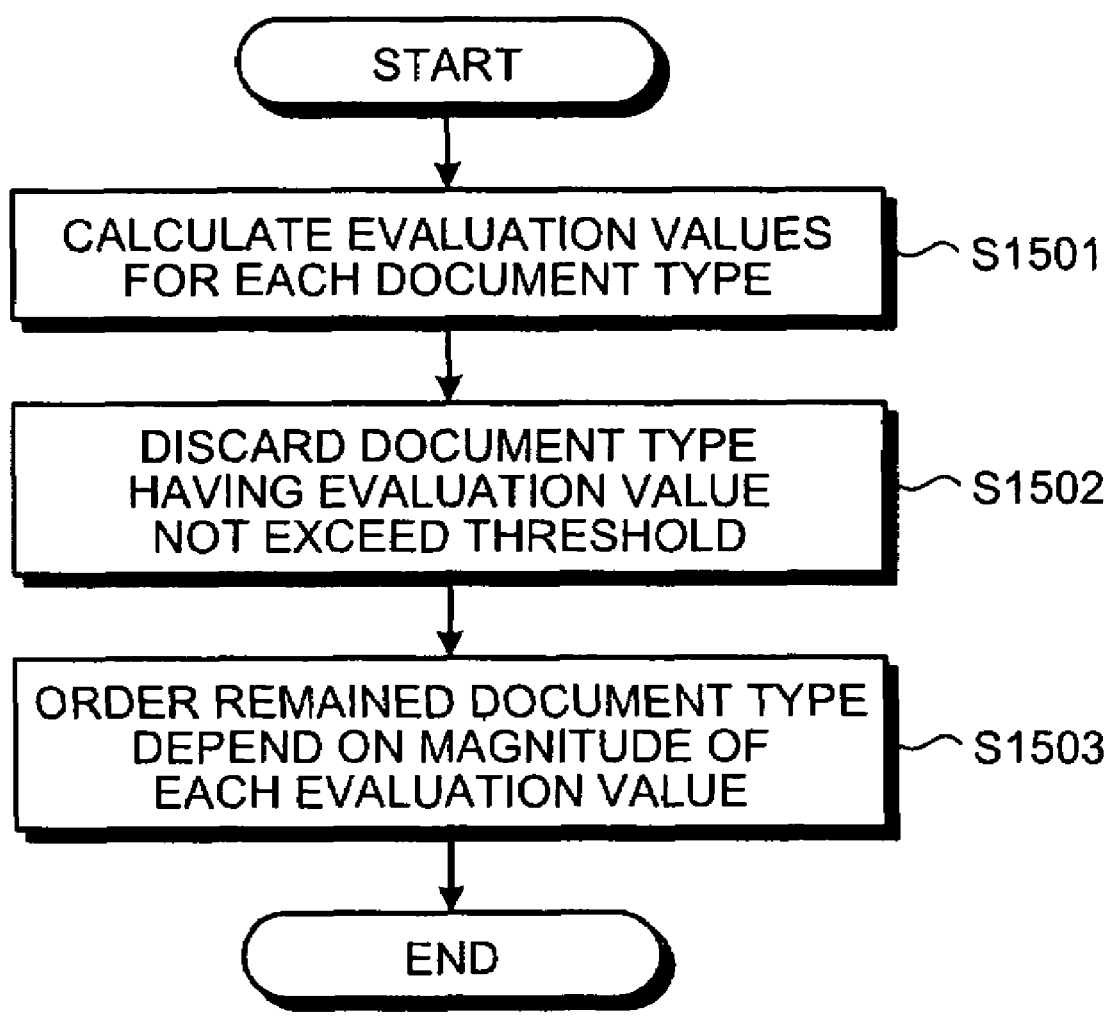

FIG.16

| DOCUMENT TYPE | KEYWORD | USAGE FLAG |
|---|---|---|
| PACKING LIST FORM | PACKING LIST FORM | 0 |
| PACKING LIST FORM | DELIVERY DATE | -1 |
| PACKING LIST FORM | TOTAL AMOUNT | -1 |
|  |  |  |
| LIST OF QUOTATION | LIST OF QUOTATION | 0 |
| LIST OF QUOTATION | PERIOD OF VALIDITY | -1 |
| LIST OF QUOTATION | TOTAL AMOUNT | -1 |
|  |  |  |
| CARD APPLICATION FORM | CARD APPLICATION FORM | 0 |
| CARD APPLICATION FORM | APPLICANT NAME | -1 |
| CARD APPLICATION FORM | PHONE NUMBER | -1 |

FIG.20

| DOCUMENT TYPE | KEYWORD GROUP | KEYWORD | HIERARCHY LEVEL |
|---|---|---|---|
| PACKING LIST FORM | PACKING LIST FORM | PACKING LIST FORM | 0 |
| PACKING LIST FORM | DELIVERY DATE | DELIVERY DATE | 1 |
| | | SHIPPING DATE | |
| | | SENDING DATE | |
| PACKING LIST FORM | TOTAL AMOUNT | AMOUNT | 1 |
| | | AGGREGATION AMOUNT | |
| | | TOTAL AMOUNT | |
| LIST OF QUOTATION | LIST OF QUOTATION | LIST OF QUOTATION | 0 |
| LIST OF QUOTATION | PERIOD OF VALIDITY | PERIOD OF VALIDITY | 1 |
| | | QUOTATION EXPIRATION DATE | |
| LIST OF QUOTATION | TOTAL AMOUNT | AMOUNT | 1 |
| | | AGGREGATION AMOUNT | |
| | | TOTAL AMOUNT | |
| CARD APPLICATION FORM | CARD APPLICATION FORM | CARD APPLICATION FORM | 0 |
| CARD APPLICATION FORM | APPLICANT NAME | NAME | 1 |
| | | SIGNATURE | |
| | | FULL NAME | |
| CARD APPLICATION FORM | PHONE NUMBER | PHONE NUMBER | 1 |
| | | HOME PHONE NUMBER | |

DOCUMENT TYPE IDENTIFYING METHOD AND DOCUMENT TYPE IDENTIFYING APPARATUS

CROSS-REFERENCE TO RELATED APPLICATIONS

This application is a continuation of PCT international application Ser. No. PCT/JP2007/054576 filed on Mar. 8, 2007 which designates the United States, the entire contents of which are incorporated herein by reference.

FIELD

The embodiments discussed herein are directed to a document type identifying method and a document type identifying apparatus.

BACKGROUND

Conventionally, to recognize the word (or character) information or the like written on a paper document and automatically input the recognized data, there is a technique that identifies the type of the document based on document type identifying information stored in advance in a database. As used herein, a series of words "document type identifying information" refer to the word information, the ruled line information, an identification (ID) specifying the document type, or the like appeared on the document.

For example, Japanese Laid-open Patent Publication No. 2001-202466 discloses a technique that identifies the document type by checking matching of grouped word strings extracted based on a word recognition result obtained from document data received as an input with document type identifying keywords (which represent words frequently used in each document type) stored in advance in the database for each document type.

The conventional technique described above has a problem of failing to accurately identify the document type due to the following facts.

Because the document data received as the input includes many unwanted word strings such as explanation statements or remarks, it is difficult to extract the grouped word strings themselves that correspond to the document type identifying keywords stored in advance in the database. Therefore, for example, when a series of words "packing list form" is stored in the database as one of the document type identifying keywords that identify one of the document types and the grouped word string "packing list form (and receipt)" is extracted from the received document data, the document type identifying keyword does not match with the grouped word string, resulting in document type identification with poor accuracy.

Further, when the document data received as the input includes the word string consisting of three words with one word being incorrect, a word recognition rate of this word string is 67% and this word string is typically not matched with the keywords and not extracted. Therefore, when the document data includes the word string consisting of three words with one word being incorrect, the word string consisting of three words used as a title word string that is important to identify the document type such as a "card application form", "packing list form", "list of quotation", or the like is not extracted, resulting in document type identification with poor accuracy.

SUMMARY

According to an aspect of an embodiment of the invention, a document type identifying apparatus that identifies a document type of a document having word information on word strings and ruled line information on ruled lines written thereon, includes an input unit that receives inputs regarding the word information on the word strings and the ruled line information on the ruled lines written on the document; a document type identifying information storing unit that stores therein a plurality of keywords used as keys that identify document types in association with each document type; a partial keyword string generating unit that generate a plurality of partial keyword strings for each keyword by using the keywords stored in the document type identifying information storing unit, the partial keyword strings being to be checked for matching with the word strings written on the document; a word string aligning unit that, based on the word information and the ruled line information, generates grouped word strings by grouping the words written on the document and overlapping each other in terms of height when seen from a lateral direction, and aligns each of the generated grouped word strings; a partial keyword string matching unit that checks matching of each of the grouped word strings aligned by the word string aligning unit with each of the partial keyword strings generated by the partial keyword string generating unit, obtains, for each of the keywords, number of matched words with a highest matching rate between each of the grouped word strings and each of the partial keyword strings, and calculates an evaluation value for each document type by using each of the obtained number of matched words, each evaluation value evaluating a possibility of each document type to be the type of the document; and a document type determining unit that, based on each evaluation value calculated for each document type by the partial keyword string matching unit, determines the document type of the document having the word information and the ruled line information written thereon.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic for explaining how a partial keyword string is generated according to the first embodiment;

FIG. 4 is a table of exemplary structure of information stored in a document type identifying information database according to the first embodiment;

FIG. 5 is a schematic of exemplary aligned word strings according to the first embodiment;

FIG. 6 is a schematic of how a grouped word string is generated according to the first embodiment;

FIG. 7 is a schematic of how the grouped word string is checked for matching with the partial keyword string according to the first embodiment;

FIG. 11 is an exemplary conversion table according to the first embodiment;

FIG. 12 is a schematic of an exemplary output of the document type according to the first embodiment;

FIG. 13 is a flowchart of how the word strings aligning is processed according to the first embodiment;

FIG. 14 is a flowchart of how the partial keyword strings are generated according to the first embodiment;

FIG. 15 is a flowchart of how the document type is determined according to the first embodiment;

FIG. 16 is a table of an exemplary structure of a document type identifying information database according to a second embodiment;

FIG. 20 is a table of an exemplary structure of a document type identifying information database according to a fourth embodiment.

DESCRIPTION OF EMBODIMENTS

Exemplary embodiments of a document type identifying program, a document type identifying method, and a document type identifying apparatus according to the present invention are described below in greater detail with reference to the accompanying drawings. The document type identifying apparatus is explained in the first embodiment and then other embodiments of the present invention are explained below.

Figure 1:
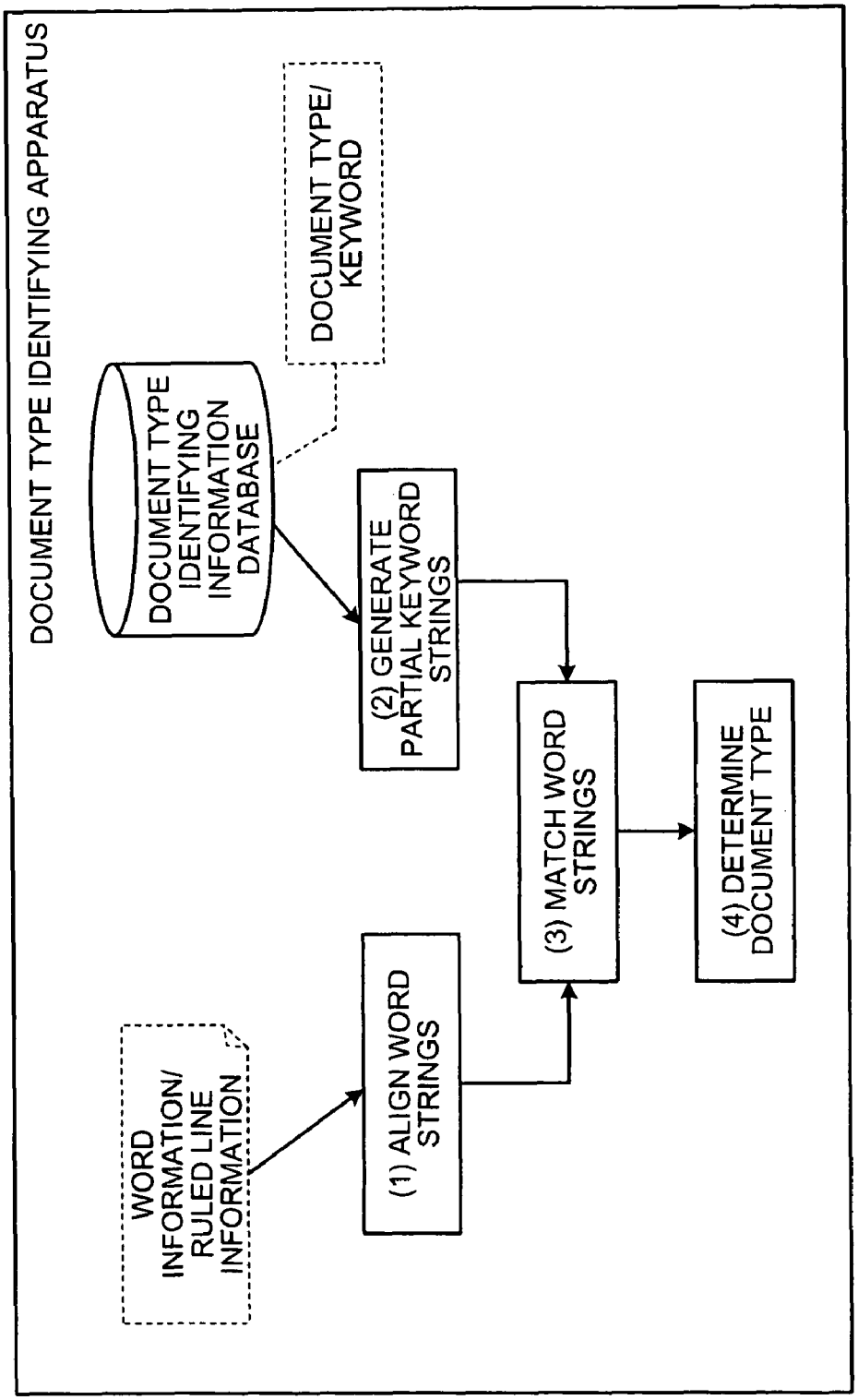
FIG. 1 is a schematic for explaining an overview and features of a document type identifying apparatus according to a first embodiment.

Referring to FIGS. 1 and 2, the overview and the features of a document type identifying apparatus according to a first embodiment are explained. FIG. 1 is a schematic for explaining the overview and the features of the document type identifying apparatus according to the first embodiment. FIG. 2 is a schematic for explaining how a partial keyword string is generated according to the first embodiment.

The document type identifying apparatus according to the first embodiment receives inputs regarding word information on word strings written on a document (information including character codes specifying characters and position information having coordinates on the document) and ruled line information on ruled lines (information including coordinates on the document of a start point and an end point of each ruled line, cell information, and the like). Then, the document type identifying apparatus identifies a document type of the document (e.g., the document type such as "card application form" and "packing list form") having the word information and the ruled line information written thereon. The main feature of the document type identifying apparatus is to enable to identify the document types with high accuracy.

To explain the main feature in more detail, the document type identifying apparatus according to the first embodiment stores therein in advance a document type identifying information database as depicted in FIG. 1. The document type identifying information database stores therein a plurality of keywords corresponding to each document type and used as document type identifying keys.

Upon receiving inputs regarding the word information on the word strings and the ruled line information on the ruled lines written on the document, the document type identifying apparatus according to the first embodiment aligns the word strings written on the document (see FIG. 1 (1)). Specifically, based on the word information and the ruled line information, the document type identifying apparatus left-aligns all lines of words written on the document and generates grouped word strings by grouping words overlapping each other in terms of height when seen from a lateral direction. After generating the grouped word strings, when any grouped word strings includes a ruled line, the document type identifying apparatus according to the first embodiment divides the grouped word string(s) at the ruled line(s) and aligns the grouped word strings.

The document type identifying apparatus according to the first embodiment uses the keywords stored in the document type identifying information database to generate a plurality of partial keyword strings for each keyword (see FIG. 1 (2)). The partial keyword strings are to be checked for matching with the word strings written on the document.

Referring to FIG. 2 and explaining in more detail, for example, upon receiving an input regarding a number of words contained in each partial keyword string from a user, the document type identifying apparatus according to the first embodiment retrieves all keywords for each document type from a document type identifying information database 13a. For example, to generate the two-word partial keyword strings from the three-word keyword "card application form" stored in the document type identifying information database as the keyword for the document type "card application form", the document type identifying apparatus assigns "0" or "1" to each word contained in the keyword, namely "card", "application", and "form", such that only two words are assigned with "1" without overlapping. Then, only words having "1" are extracted to generate the partial keyword strings (0: "card form", 1: "card application", and 3: "application form"). The word assigned with "1" is determined using binary numbers corresponding to decimal numbers three to six.

The document type identifying apparatus according to the first embodiment checks matching of each aligned and grouped word string with each generated partial keyword string (see in FIG. 1 (3)). Specifically, the document type identifying apparatus according to the first embodiment checks matching of each grouped word string with each partial keyword string using a common words recognition approach such as a dynamic programming (DP) matching or a graph theory.

The document type identifying apparatus according to the first embodiment obtains, for each keyword, a number of matched words with the highest matching rate between each grouped word string and each successfully matched partial keyword string. For example, when the matching rate between an exemplary three-word grouped word string and each of the three two-word partial keyword strings generated from the keyword "card application form" (namely, "card form", "card application", and "application form") are 66%, 50%, and 25%, the number of matched words with the highest matching rate of 66% is selected. The matching rate is obtained by dividing the number of matched partial keyword strings by total number of words contained in the keyword that derives the partial keyword strings. The number of matched words is obtained by considering the number of words contained in each partial keyword string and the number of matched partial keyword strings with respect to each grouped word string.

After obtaining the number of matched words for each keyword, the document type identifying apparatus according to the first embodiment uses each number of matched words to calculate each evaluation value to determine the document type (see FIG. 1 (4)). Each evaluation value is a value that evaluates a possibility of each document type to be the type of the document under consideration. Specifically, the document type identifying apparatus according to the first embodiment calculates each evaluation value for each document type by dividing a total number of matched words by the total number of words used in the keywords for each document type. Then, the document type identifying apparatus determines whether each evaluation value calculated for each document type exceeds a defined threshold. As a result of the determination, if the document type identifying apparatus discards document types corresponding to the evaluation value not exceeding their thresholds. On the other hand, as a result of the determination, if only one document type corresponds to an evaluation value exceeding its threshold, the document type identifying apparatus selects and outputs the document type corresponding to the evaluation value. If a plurality of document types corresponds to evaluation values exceeding their thresholds, the document type identifying apparatus ranks the document types according to a magnitude of each evaluation value and outputs the document types.

In this way, the document type identifying apparatus according to the first embodiment can identify the document type with high accuracy as the main feature described above.

Figure 3:
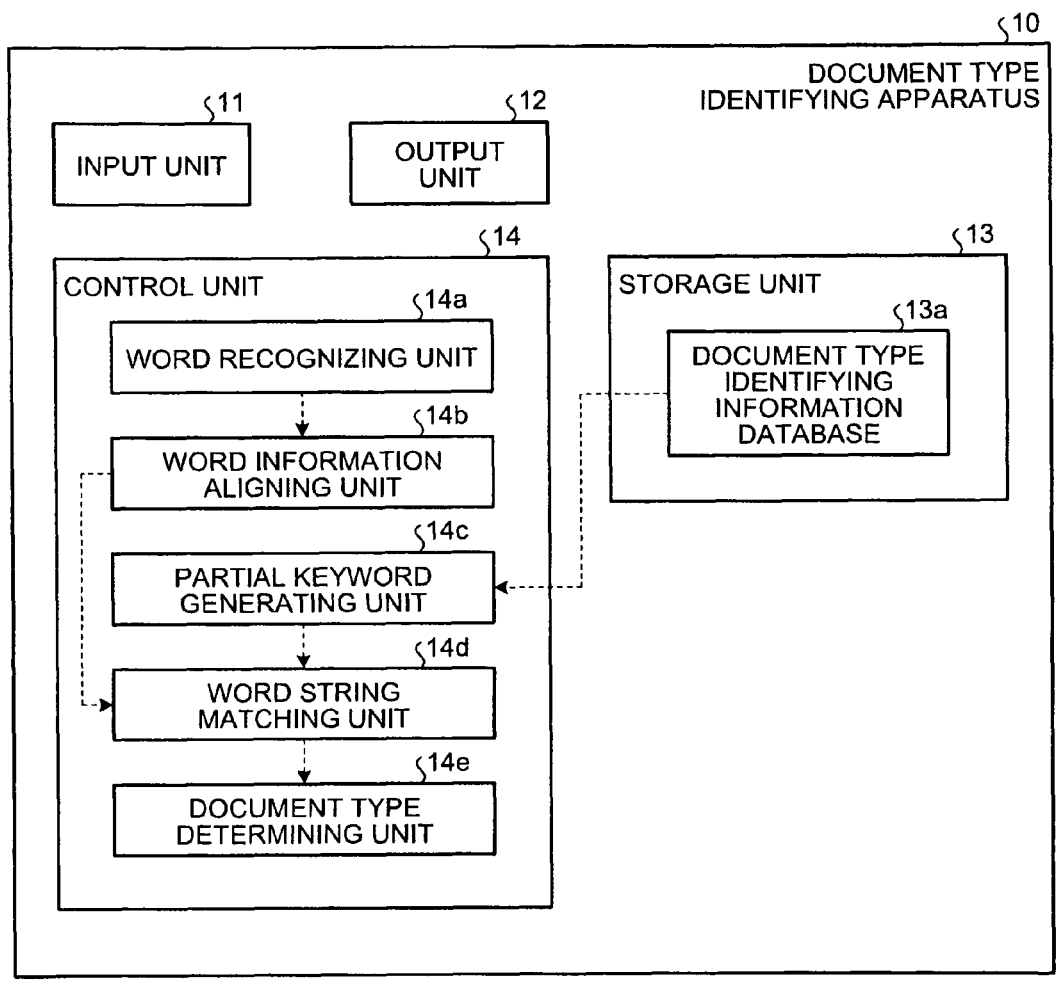
FIG. 3 is a block diagram of the document type identifying apparatus according to the first embodiment.
Figure 8:
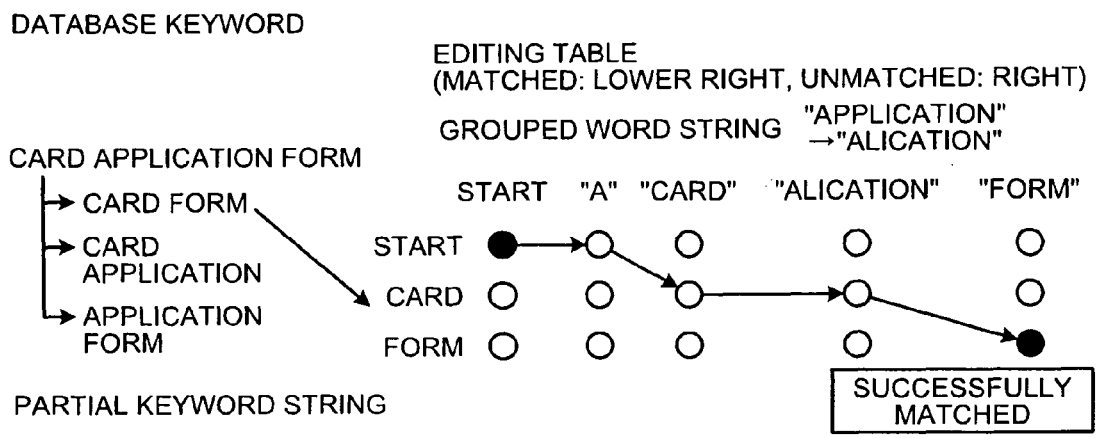
FIG. 8 is a schematic of how the grouped word string is checked for matching with the partial keyword string according to the first embodiment.
Figure 9:
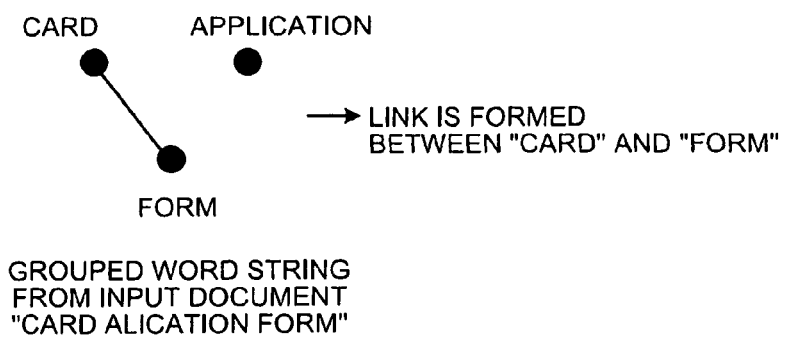
FIG. 9 is a schematic of how the grouped word string is checked for matching with the partial keyword string according to the first embodiment.
Figure 10:
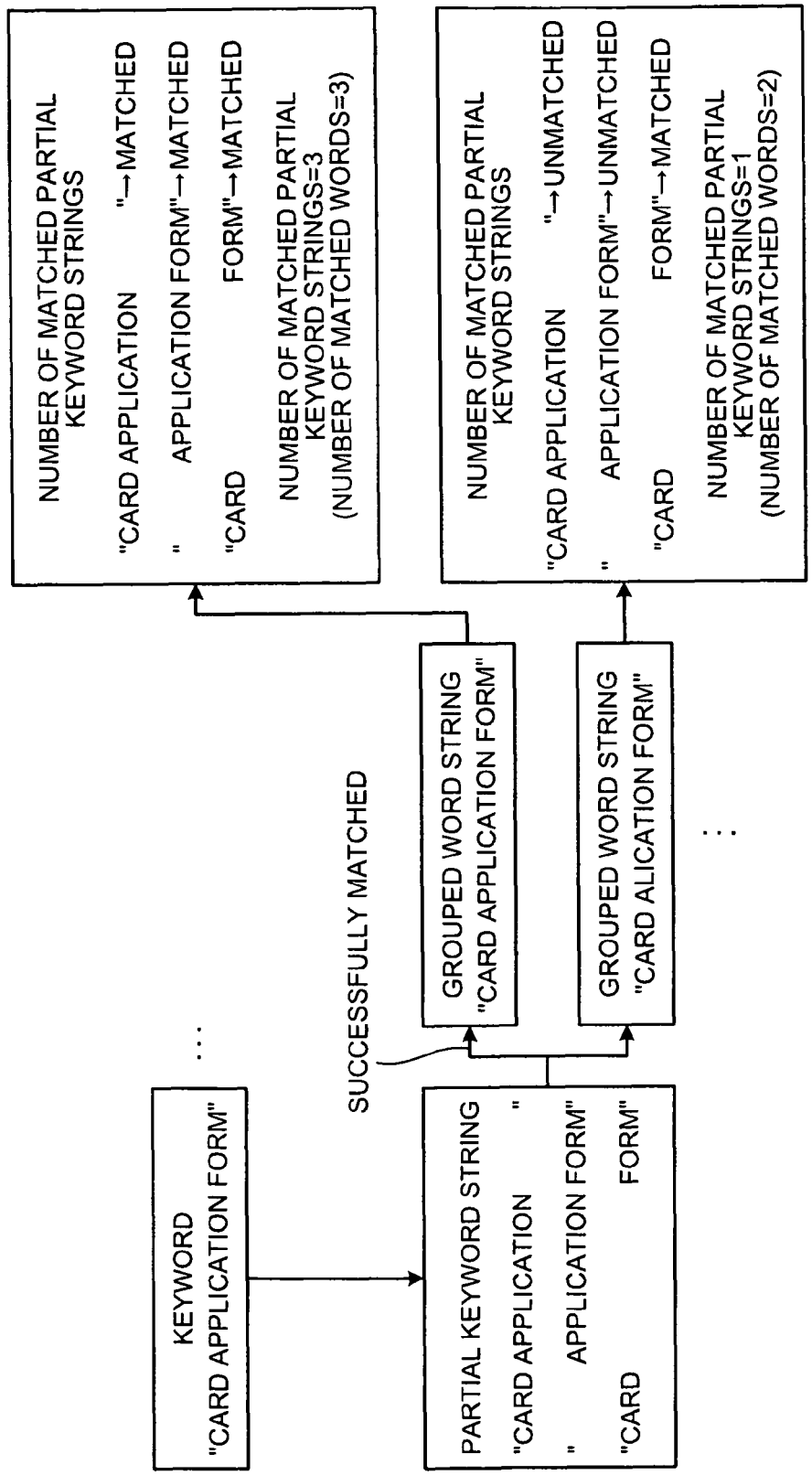
FIG. 10 is a schematic of how the grouped word string is checked for matching with the partial keyword string according to the first embodiment.

Referring to FIGS. 3 to 12, components of the document type identifying apparatus according to the first embodiment are explained. FIG. 3 is a block diagram of the document type identifying apparatus according to the first embodiment. FIG. 4 is a table of exemplary structure of information stored in the document type identifying information database according to the first embodiment. FIG. 5 is a schematic of exemplary aligned word strings according to the first embodiment. FIG. 6 is a schematic of how a grouped word string is generated according to the first embodiment. FIGS. 7 to 9 are schematics of how the grouped word string is checked for matching with the partial keyword string according to the first embodiment. FIG. 10 is a schematic of how the grouped word string is checked for matching with the partial keyword string according to the first embodiment. FIG. 11 is an exemplary conversion table according to the first embodiment. FIG. 12 is a schematic of an exemplary output of the document type according to the first embodiment.

As depicted in FIG. 3, a document type identifying apparatus 10 according to the first embodiment includes an input unit 11, an output unit 12, a storage unit 13, and a control unit 14. Note that, FIG. 3 shows only components required to implement the document type identifying apparatus according to the first embodiment, thereby description of other components are omitted.

The input unit 11 receives various information inputs and includes a keyboard, a mouse, a microphone, or the like. For example, the input unit 11 receives a length of partial keyword string (number of words) or the like that is generated from a keyword, received via a keyboard. The input unit 11 further performs a data reading function to read image data of the document and then to output the image data to a word recognizing unit 14a.

The output unit 12 outputs various types of information and includes a monitor (or a display or a touch sensitive panel) or a speaker. For example, the output unit 12 outputs and displays results of a process performed by a document type determining unit 14e as will be described below, besides the image data of the document read by the input unit 11.

The storage unit 13 stores therein data and programs required for various processes performed by the control unit 14. Particularly, a component in the storage unit 13 closely related to the present invention includes the document type identifying information database 13a.

The document type identifying information database 13a stores therein information required for a partial keyword string generating process performed by a partial keyword generating unit 14c that will be described below. In particular, as exemplary depicted in FIG. 4, the document type identifying information database 13a stores therein keywords used as keys that identify the document types (e.g., "packing list form", "delivery date", "total amount", or the like) in association with document types (e.g., "packing list form", "list of quotation", "card application form", or the like).

The control unit 14 has an internal memory that stores therein predetermined controlling programs, programs defining various process procedures, and necessary data and performs various processes using these programs and data. Particularly, components in the control unit 14 closely related to the present invention include the word recognizing unit 14a, a word information aligning unit 14b, the partial keyword generating unit 14c, a word string matching unit 14d, and the document type determining unit 14e.

The word recognizing unit 14a obtains the word information and the ruled line information from the image data of the document. Specifically, from the image data of the document received from the input unit 11, the word recognizing unit 14a obtains the word information (information including character codes specifying characters and position information having coordinates on the document) and ruled line information on ruled lines (information including coordinates indicate a start point and an end point of each ruled line on the document, cell information, and the like) and then outputs the information to the word information aligning unit 14b.

The word information aligning unit 14b is a processing unit that aligns the word strings written on the document, by viewing the aligned word strings in a lateral direction, based on the word information and the ruled line information received from the word recognizing unit 14a. Specifically, as depicted in FIG. 5, based on the word information and the ruled line information, the word information aligning unit 14b left-aligns all lines of words and generates grouped word strings (e.g., first to seventh grouped word strings) by grouping the words overlapping each other in terms of height.

In particular, after left-aligning all lines of words, by viewing the aligned word strings in a lateral direction, the word information aligning unit 14b determines, for example, if a height of the word "card" overlaps the height of the word "application" located right side of the word "card" as depicted in FIG. 6. If the height of the word "card" overlaps the height of the word "application", the word information aligning unit 14b treats the word "card" and the "application" as a group. The word information aligning unit 14b also determines a height of the word string "card application" overlaps the height of the word "form" located right side of the word "application". If they overlap, the word information aligning unit 14b treats the word string "card application" and the word "form" as a group. After generating the grouped word strings, if the grouped word string(s) includes (include) the ruled line(s), the word information aligning unit 14b divides the grouped word string at the ruled line(s).

When the word strings are vertically written on the document, the word information aligning unit 14b applies the same process as described above for the horizontally written word strings to the vertically written word strings. In particular, the word information aligning unit 14b top-aligns all columns of words and treats the words overlapping each other in terms of width as the grouped word string.

The partial keyword generating unit 14c uses the keywords stored in the document type identifying information database 13a to generate the partial keyword strings for each keyword. The partial keyword strings are to be checked for matching with the word strings written on the document.

Specifically, upon receiving the inputs regarding the partial keyword string word number via the input unit 11, the partial keyword generating unit 14c retrieves all keywords for each document type from the document type identifying information database 13a. Then, for example, to generate the two-word partial keyword string from the three-word keyword "card application form" stored in the document type identifying information database 13a as the keyword for the document type "card application form", the partial keyword generating unit 14c assigns "0" or "1" to each word included in the keyword, namely "card", "application", and "form", such that only two words are assigned with "1" without overlapping. Then, only words having "1" are extracted to generate partial keyword strings (0: "card form", 1: "card application", and 2: "application form").

For example, when two-word partial keyword strings are to be extracted from the three-word keyword, which is assigned with "1" is obtained by converting decimal numbers three to six to binary numbers consisting of "0" and "1".

The word string matching unit 14d checks matching of each grouped word string generated and aligned by the word information aligning unit 14b with each partial keyword string generated by the partial keyword generating unit 14c. Specifically, as exemplary depicted in FIGS. 7 to 9, the word string matching unit 14d checks matching of each grouped word string with each partial keyword string using a common words recognition approach such as a DP matching or a graph theory.

Then, the word string matching unit 14d obtains, for each keyword, a number of matched words with the highest matching rate between each grouped word string and each successfully matched partial keyword string.

As depicted in FIG. 10, the grouped word string "card application form" is checked for matching with each of the three two-word partial keyword strings generated from the keyword "card application form" (namely, "card form", "card application", and "application form"). In this case, the number of matched partial keyword strings is "three" and the number of words contained in each partial keyword string is "two". The number of matched partial keyword strings "3" and the number of words contained in each partial keyword string "2" are applied to a conversion table as exemplary depicted in FIG. 11 to obtain the number of matched words. In detail, when the number or words included in a partial keyword string is "two", a row noted "m=2" in the conversion table is focused. Then, in the row noted "m=2", the number equal to the number of matched partial keyword strings, namely "3" is looked for. A value of "n" at a top of a column having the number equal to the number of matched partial keyword strings, namely "n'=3" in this case, is the number of matched words for the keyword "card application form".

Similarly, as an example, the exemplary grouped word string "card appliance (erroneous word) form" is checked for matching with each of the three two-word partial keyword strings generated from the keyword "card application form" ("card form", "card application", and "application form") (see FIG. 10). In this case, the number of matched partial keyword strings is "1" and the number of words contained in each partial keyword string is "2". Applying these numbers to the conversion table gives the number of matched words for the keyword of "n'=2".

In this way, even with the same keyword, the number of matched words may be different depending on each grouped word string. For example, when the matching rates of three exemplary grouped word strings and each of the three two-word partial keyword string generated from the keyword "card application form" (namely, "card form", "card application", and "application form") are 66%, 50%, and 25%, the number of matched words with the highest matching rate of 66% is selected. The matching rate is obtained by dividing the number of matched partial keyword strings by total number of words contained in the keyword that derives the partial keyword strings. In this way, by checking matching of the partial keyword strings generated from the keyword, even the grouped word string having misspelled words such as "card appliance form" can be identified.

The document type determining unit 14e uses each number of matched words obtained for each keyword in the word string matching unit 14d to calculate each evaluation value to determine the document type. The document type is determined by calculating the evaluation value that evaluates a possibility of each document type to be the type of the document under consideration. Specifically, the document type determining unit 14e calculates each evaluation value for each document type by dividing a total number of matched words by the total number of words used in the keywords for each document type. Then, the document type determining unit 14e determines whether each evaluation value calculated for each document type exceeds the defined threshold. As a result of the determination, if the evaluation value does not exceed its threshold, the document type determining unit 14e discards the document type corresponding to the evaluation value. If only one evaluation value is found to exceed its threshold, the document type determining unit 14e selects and outputs the document type corresponding to the evaluation value.

As a result of determination as to whether evaluation value calculated for each document type exceeds the defined threshold, if the evaluation values are determined to exceed their thresholds, the document type determining unit 14e may order and output the document types corresponding to the evaluation values according to the magnitude of each evaluation value (see FIG. 12) or determine and output the document type with the highest evaluation value.

Referring to FIGS. 13 to 15, processing by the document type identifying apparatus according to the first embodiment is explained. FIG. 13 is a flowchart of how the word strings are aligned is processed according to the first embodiment. FIG. 14 is a flowchart of how the partial keyword strings are generated according to the first embodiment. FIG. 15 is a flowchart of how the document type is determined according to the first embodiment.

Referring to FIG. 13, a flow of the word string aligning process according to the first embodiment is explained. As depicted in FIG. 13, the word information aligning unit 14b left-aligns all lines of words written on the document based on the word information and the ruled line information received from the word recognizing unit 14a (Step S1301).

The word information aligning unit 14b groups the aligned word strings (Step S1302) to generate a grouped word string. In particular, the word information aligning unit 14b groups the words overlapping each other in terms of height when viewing the aligned word strings in a lateral direction (see FIG. 5).

After generating the grouped word string, if the grouped word string includes the ruled line(s), the word information aligning unit 14*b* divides the grouped word string at the ruled line(s) (Step S1303).

When the word strings are vertically written on the document, the word information aligning unit 14*b* applies the same process as described above for the horizontally written word strings to the vertically written word strings. In particular, the word information aligning unit 14*b* top-aligns all columns of words and treats the words overlapping each other in terms of width as the grouped word string.

Referring to FIG. 14, a flow of the partial keyword string generation process according to the first embodiment is explained. As depicted in FIG. 14, upon receiving the inputs regarding the partial keyword string word number via the input unit 11 (Step S1401), the partial keyword generating unit 14*c* retrieves all keywords for each document type from the document type identifying information database 13*a* (Step S1402).

Then, the partial keyword generating unit 14*c* uses the keywords stored in the document type identifying information database 13*a* to generate the partial keyword strings for each keyword (Step S1403). The partial keyword strings are to be checked for matching with the word strings written on the document.

Specifically, for example, to generate the two-word partial keyword string from the three-word keyword "card application form" stored in the document type identifying information database 13*a* as the keyword for the document type "card application form", the partial keyword generating unit 14*c* assigns "0" or "1" a to each word contained in the keyword, namely "card", "application", and "form", such that only two words are assigned with "1" without overlapping. Then, only words having "1" are extracted to generate the partial keyword strings (0: "card form", 1: "card application", and 2: "application form").

For example, when two-word partial keyword strings are to be extracted from the three-word keyword, which is assigned with "1" is obtained by converting decimal numbers three to six to binary numbers consisting of "0" and "1".

Referring to FIG. 15, a flow of the document type determining process according to the first embodiment is explained. As depicted in FIG. 15, the document type determining unit 14*e* uses each number of matched words obtained for each keyword at the word string matching unit 14*d* to calculate each evaluation value to determine the document type (Step S1501). The evaluation value is the value that evaluates the possibility (or probability) of each document type to be the type of the document under consideration.

The document type determining unit 14*e* determines whether each evaluation value calculated for each document type exceeds the defined threshold. As a result, if the evaluation value does not exceed its threshold, the document type corresponding to the evaluation value is discarded (Step S1502), if only one document type corresponds to an evaluation value exceeding the threshold thereof, the document type determining unit 14*e* selects and outputs the document type.

As a result of the determination, if the evaluation values are determined to exceed their thresholds, the document type determining unit 14*e* orders and outputs the document types corresponding to the evaluation values according to the magnitude of each evaluation value (Step S1503).

As described above, according to the first embodiment, the storage unit stores therein, in association with each document type (e.g., "card application form", "packing list form", "list of quotation", or the like), keywords used as keys that identify the document types (for example, information written on the document such as "card application form", "application date", "address", "name", or the like for "card application form"). Using the keywords stored in the storage unit, the partial keyword strings are generated for each keyword, which are to be checked for matching with the word strings written on the document (for example, two-word partial keyword strings from the three-word keyword such as "card application", "application form", "card form", or the like). Based on the word information on the word strings and the ruled line information on the ruled lines written on the document, each grouped word string is generated by grouping the words overlapping each other in terms of height when seen from a lateral direction and aligned. Each grouped word string is checked for matching with each partial keyword string to obtain, for each keyword, the number of matched words with the highest matching rate between each grouped word string and each partial keyword string. Using each of the obtained number of matched words, each evaluation value, which evaluates the possibility of each document type to be the type of the document under consideration, is calculated (for example, each estimation value is a value obtained by dividing the number of matched words between the grouped word strings and the partial keyword strings by the total number of words contained in the keywords). Based on each evaluation value calculated for each document type, the document type of the document having the word information and the ruled line information written thereon is determined. Therefore, the extraction is not limited to the grouped word string corresponding to one of the document type identifying keywords stored in advance in the database, enabling to identify the document type with high accuracy. Even when the word string written on the document contains an error or the word string is recognized with an error, the evaluation value that takes into account the partial matching using the partial keyword strings can be calculated, enabling to identify the document type with high accuracy.

According to the first embodiment, whether each evaluation value calculated for each document type exceeds the threshold defined for each document type is determined. Based on the determination, the document type of the document having the word information and the ruled line information written thereon is determined. Therefore, the document type can be determined in a simple manner.

According to the first embodiment, whether each evaluation value calculated for each document type exceeds the threshold defined for each document type is determined. If a plurality of document types corresponds to evaluation values determined to exceed their thresholds, the document types are ordered according to the magnitude of each evaluation value. Therefore, an ordered list of the possible document types can be provided to a user.

According to the first embodiment, whether each evaluation value calculated for each document type exceeds the threshold defined for each document type is determined. If a plurality of document types corresponds to evaluation values determined to exceed their thresholds, the document type with the highest evaluation value is selected. Therefore, the most likely document type can be provided to a user.

According to the first embodiment, if the ruled line(s) is(are) found to be in the grouped word string(s) based on the word information and the ruled line information, the grouped word string(s) is(are) divided at the ruled line(s). Therefore, the word strings can be divided to include correct words.

According to the first embodiment, all keywords for each document type are retrieved from the document type identifying information database 13*a* and the partial keyword strings are generated for each keyword. However, the present invention is not limited so and the keywords to be used may be arbitrarily selected.

Figure 17:
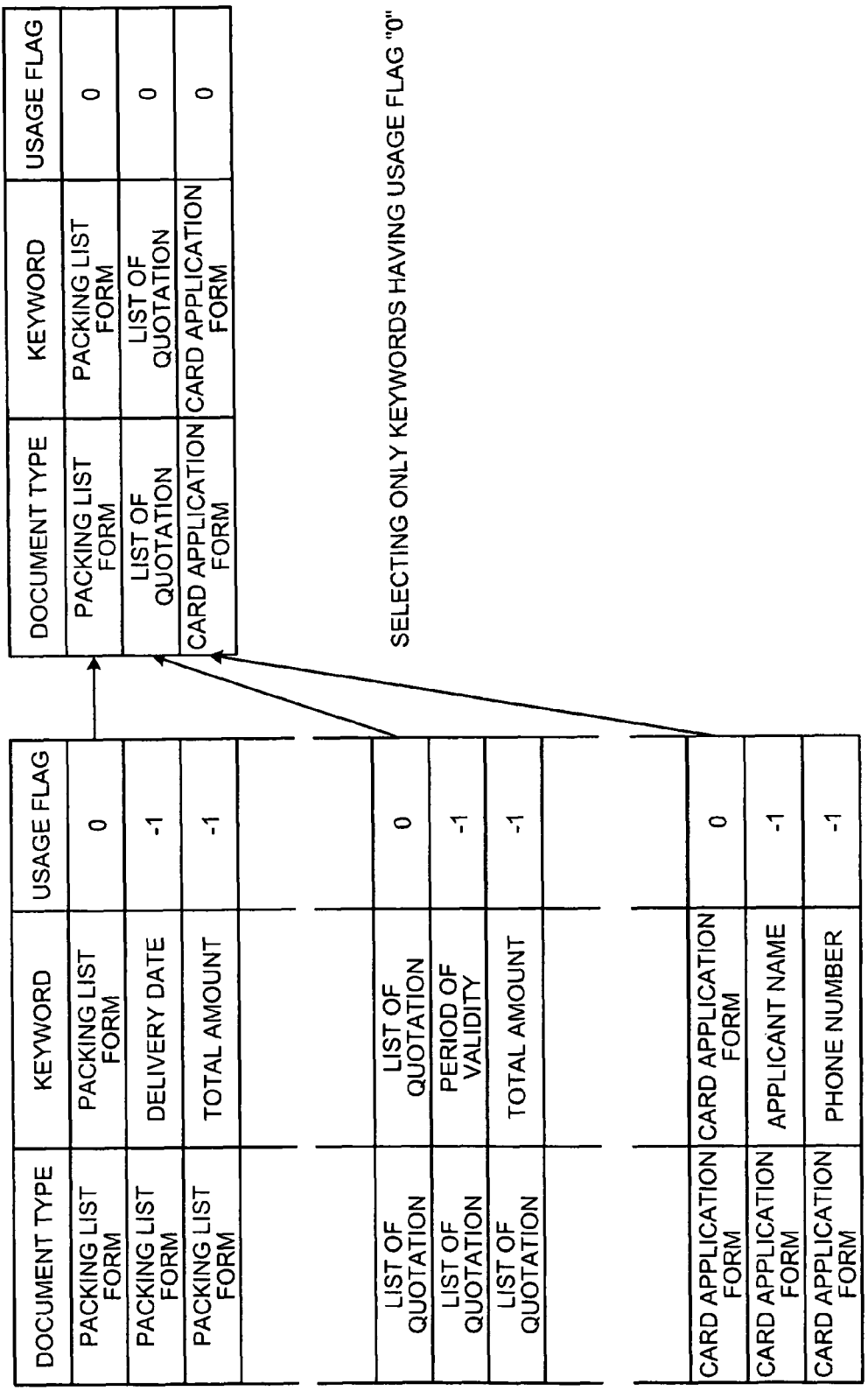
FIG. 17 is a schematic of an exemplary keyword selection according to the second embodiment.

Specifically, in a second embodiment as exemplary depicted in FIG. 16, usage flags indicating whether the keywords associated therewith is to be used or not ("0": for use, "−1": not for use) are stored in the document type identifying information database 13a. Then, the partial keyword generating unit 14c retrieves the keywords selected for each document type and having the usage flags of "0" from the document type identifying information database 13a (see FIG. 17), and generates a plurality of partial keyword strings for each retrieved keyword.

In this way, according to the second embodiment, the usage flags indicating whether the keyword associated with the keywords are to be used or not are stored in the document type identifying information database 13a. Based on the stored usage flags, among the keywords, keywords to be used are selected and used to generate the partial keyword strings for each document type. Therefore, among keywords stored in advance in the database, only necessary keyword can be used, enabling to reduce the processing time as compared with that when all keywords are processed.

Figure 18:
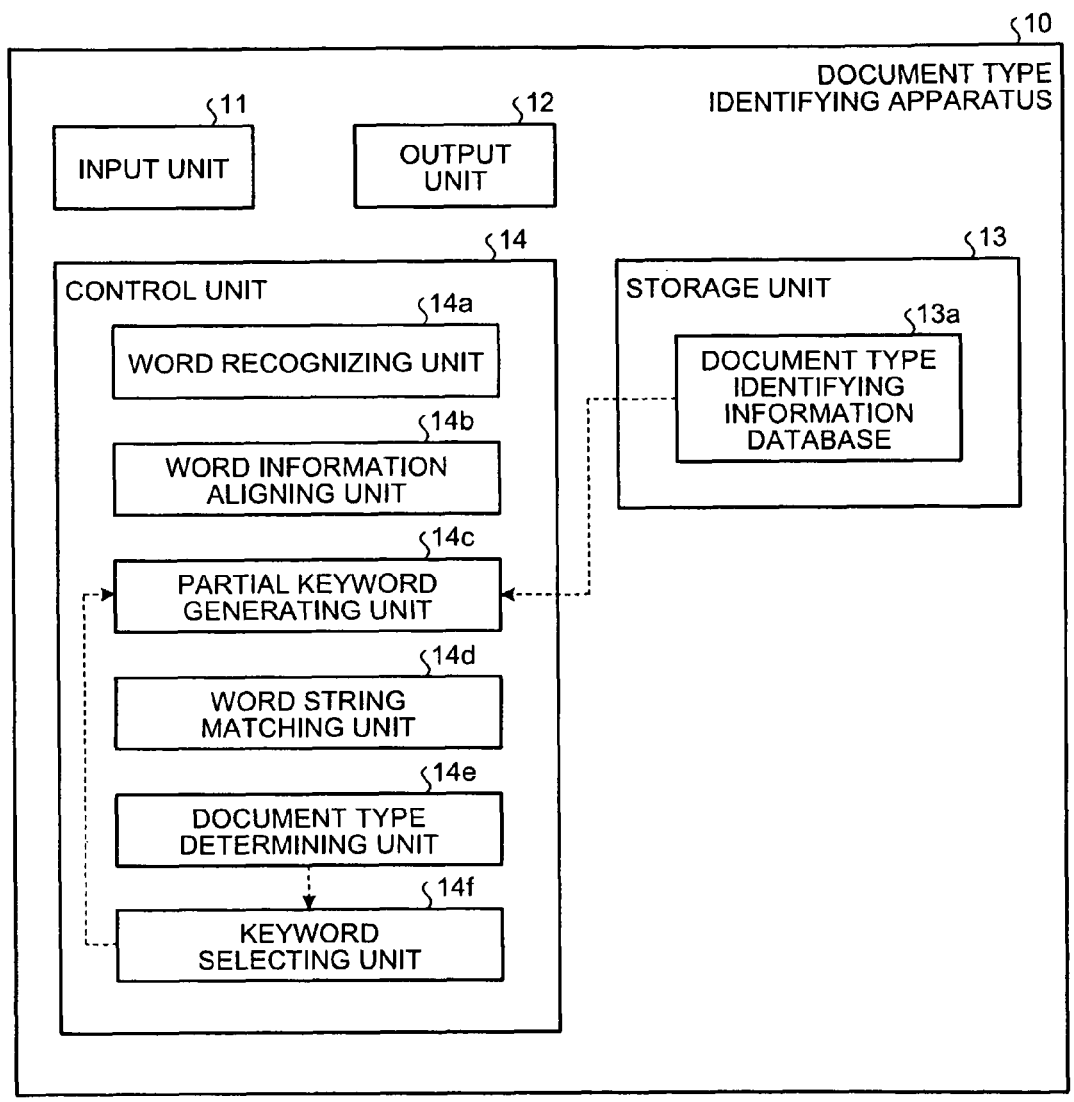
FIG. 18 is a block diagram of a structure of a document type identifying apparatus according to a third embodiment.
Figure 19:
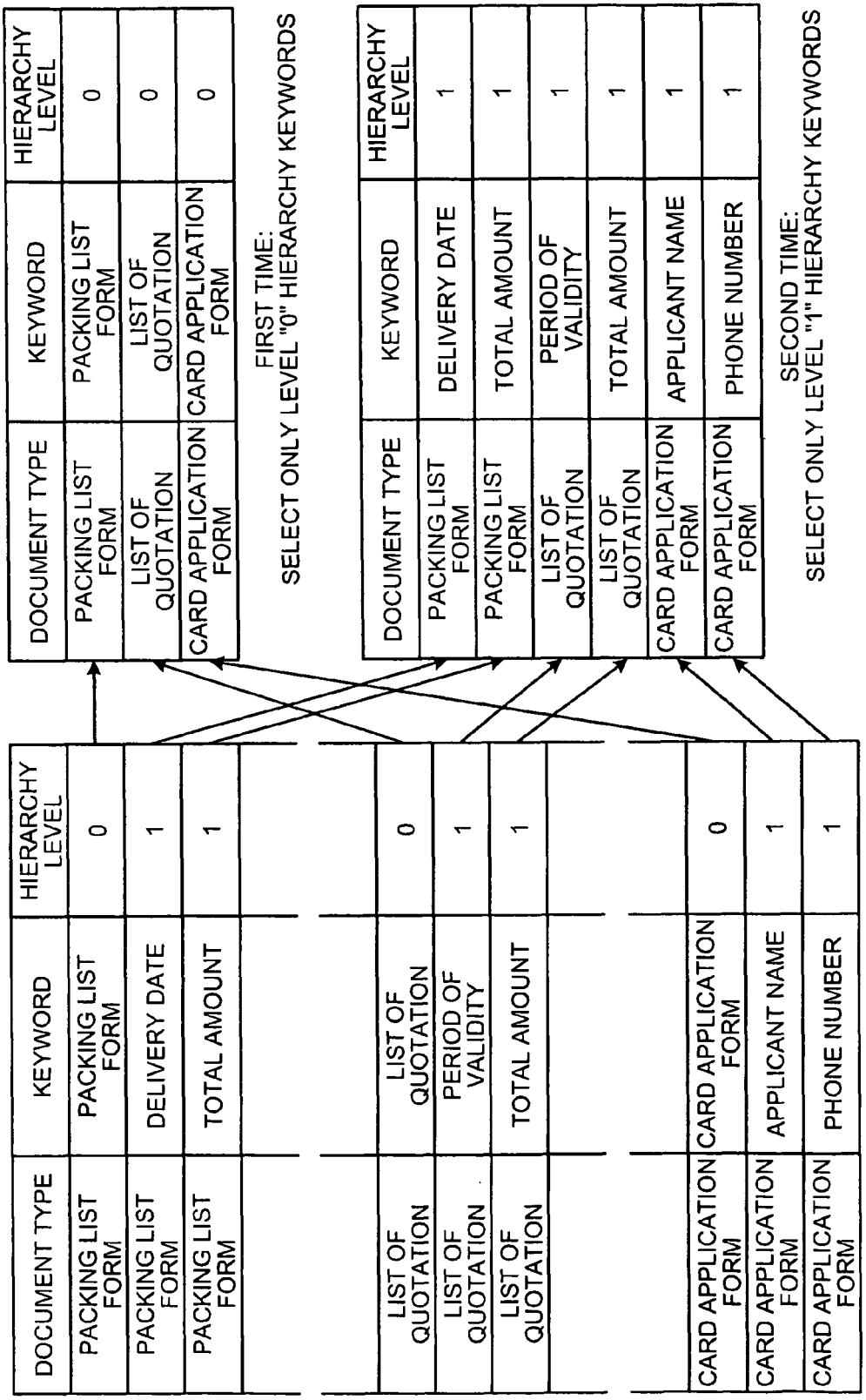
FIG. 19 is a schematic of how the keywords are modified according to the third embodiment.

According to the first embodiment, the document type is determined directly from the matching result between each grouped word string and each partial keyword string. However, the present invention is not limited so. The document type may be determined by replacing each keyword using the result of the document type determining process and repeating recursively the document type determining process using the modified keyword. Referring to FIGS. 18 and 19, the document type identifying apparatus according to a third embodiment is explained below followed by effect of the third embodiment. FIG. 18 is a block diagram of the document type identifying apparatus according to the third embodiment. FIG. 19 is a schematic of how the keywords are modified according to the third embodiment.

Referring to FIG. 18, the document type identifying apparatus according to the third embodiment is explained. The document type identifying apparatus according to the third embodiment basically includes the similar components to those of the document type identifying apparatus according to the first embodiment except the following points.

The document type identifying information database 13a stores therein keywords grouped in a predetermined hierarchy for each document type (see FIG. 19). An exemplary method that hierarchically groups the keywords is to hierarchically group by labeling a group of the keywords level "0" hierarchy keywords, level "1" hierarchy keywords", and so on, in a descending order that seems most specific to the document types.

A keyword selecting unit 14f instructs the partial keyword generating unit 14c to only select level "0" hierarchy keywords and to generate the partial keyword strings (see FIG. 19).

Similar to the first embodiment described above, after the word information aligning unit 14b, the partial keyword generating unit 14c, and the word string matching unit 14d finish processing, the document type determining unit 14e determines whether each evaluation value calculated for each document type exceeds the defined threshold. As a result of the determination, if the evaluation value does not exceed its threshold, the document type determining unit 14e discards the document type corresponding to the evaluation value, narrows the possible document types corresponding to the evaluation values that exceed their thresholds, and outputs each document type corresponding to each evaluation value that exceeds the threshold to the keyword selecting unit 14f. If none of the evaluation values exceeds the threshold, the document type determining unit 14e indicates to the keyword selecting unit 14f that no document type exists that corresponds to the evaluation value exceeding the threshold.

Upon receiving information of each document type from the document type determining unit 14e, the keyword selecting unit 14f selects only level "1" hierarchy keywords from the keywords corresponding to the received document type and instructs the partial keyword generating unit 14c to generate the partial keyword strings using the selected keywords. When receiving the indication that no document type exists that corresponds to the evaluation value exceeding the threshold from the document type determining unit 14e, the keyword selecting unit 14f instructs the partial keyword generating unit 14c to select only level "1" hierarchy keywords for all document types and to generate the partial keyword strings using only selected keywords (see FIG. 19).

Again, after the partial keyword generating unit 14c and the word string matching unit 14d finish processing the keywords and the partial keyword strings, the document type determining unit 14e determines whether each evaluation value calculated for each document type exceeds the defined threshold. As a result of the determination, if the evaluation value does not exceed its threshold, the document type determining unit 14e discards the document type corresponding to the evaluation value. On the other hand, if a number of the document types corresponding to the evaluation values exceeding the threshold is narrowed to a predetermined number, the document type determining unit 14e may output the document types ordered according to the magnitude of each evaluation value or may output the document type with the highest evaluation value.

A number of process iteration performed by the partial keyword generating unit 14c, the word string matching unit 14d, the document type determining unit 14e, and the keyword selecting unit 14f may be pre-set. Then, when the number of the process iteration is reached, the document type determining unit 14e may output the document type(s) at that point of time.

As described above, according to the third embodiment, each time the evaluation value for each document type is calculated, the number of the possible document types is narrowed based on each evaluation value (for example, the document type with the lowest evaluation value is excluded and the document types that are more likely to be the type of the document are remained). Each time the number of possible document type is reduced from the keywords stored in the storage unit, the keyword information is replaced corresponding to the remained possible document types. Each time the keyword information is replaced, the partial keyword strings are generated using the modified keywords. Each time the partial keyword strings are generated, each grouped word string is checked for matching with each partial keyword string to obtain, for each keyword, the number of matched words with the highest matching rate between each grouped word string and each partial keyword string. Each evaluation value is calculated for each document type using the obtained number of matched words. The evaluation value is a value that evaluates the possibility of each document type to be the type of the document under consideration. Therefore, the keyword(s) of the apparently unwanted document type is(are) excluded from the processing, enabling to reduce the processing time and the iteration number of the processing while identifying the document type with high accuracy.

While the first to the third embodiments of the present invention have been described, different embodiments other than the embodiments described above are also possible. Other embodiment of the present invention is described below.

The keywords having the same meaning may be stored as a group in the document type identifying information database 13a. In particular, as exemplary depicted in FIG. 20, the keywords for the document type "packing list form" having the same meanings, for example, "delivery date", "shipping date", and "sending date" can be stored in the document type identifying information database 13a as a keyword group of "delivery date".

Then, each grouped word string is checked for matching with each partial keyword string. From each keyword group, the keyword with the highest the matching rate between each grouped word string and each partial keyword string is extracted (for example, from the keyword group "delivery date", including the keywords "delivery date", "shipping date", and "sending date", the keyword with the highest matching rate is extracted). As with the embodiments described above, each number of matched words for each extracted keyword is obtained. Using the obtained keyword, each evaluation value is calculated for each document type. The evaluation value is a value that evaluates the possibility of each document type to be the type of the document under consideration. Therefore, the document type can be identified with high accuracy.

In particular, the keywords for the document type "card application form", for example, "application date" and "filling date" are treated as a group having the same meaning. In comparison between the matching rate of the partial keyword strings generated from the keywords "application date" and "filling date" and the grouped word string generated from the word information and the ruled line information written on the document, when the matching rate of the partial keyword strings generated from the keyword "application date" is higher than that of the keyword "filling date", the evaluation rate is calculated using the number of matched words of the partial keyword strings generated from the keyword "application date". Therefore, the document type can be identified with high accuracy without reducing the evaluation value.

Components of the document type identifying apparatus 10 depicted in FIGS. 3 and 18 are depicted in functional and conceptual way and not necessarily required to be physically arranged as depicted in figures. That is, how components of the document type identifying apparatus 10 are particularly distributed or integrated is not limited to those depicted in figures. How a portion or all of each component can be functionally or physically distributed or integrated in any granularity depending on various load level, usage status, or the like. For example, the word string matching unit 14d can be integrated in to the document type determining unit 14e. Similarly, all or any portion of each processing function performed in the document type identifying apparatus 10 may be implemented as a central processing unit (CPU), programs analyzed and executed in the CPU, or wired logic hardware.

Figure 21:
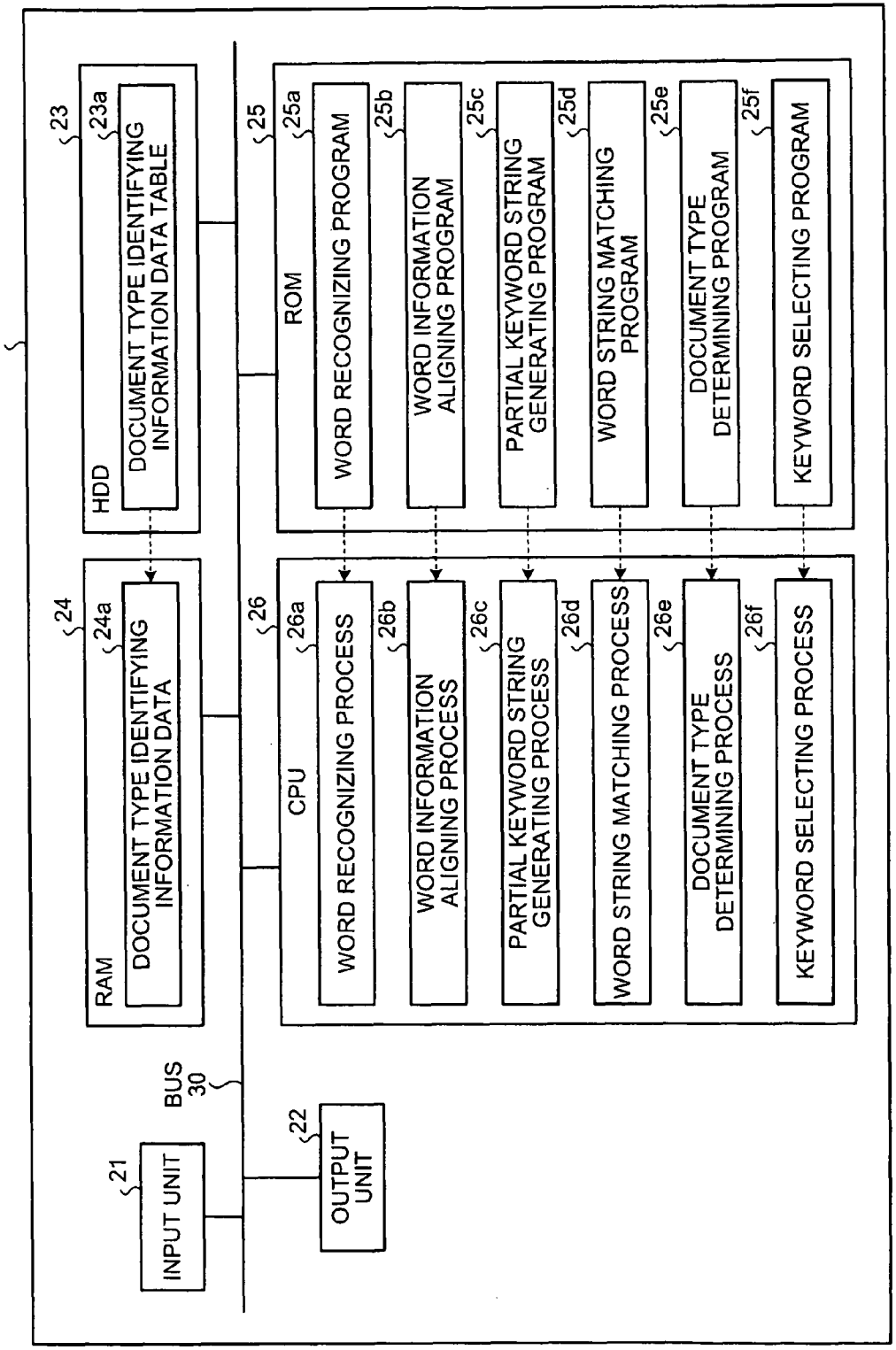
FIG. 21 is a schematic of a computer that executes document type identifying programs.

Various processes according to the embodiments described above can be implemented by executing prepared programs in a computer system such as a personal computer or a workstation. Referring to FIG. 21, an example of a computer is explained below, which executes the document type identifying programs having functions similar to the embodiments described above. FIG. 21 is a schematic of the computer that executes the document type identifying programs.

As depicted in FIG. 21, a computer 20 functioning as a document type identifying apparatus includes an input unit 21, an output unit 22, a hard disk drive (HDD) 23, a random access memory (RAM) 24, a read only memory (ROM) 25 functioning as a computer-readable storage medium, and a CPU 26, all of which are connected via a bus 30. The input unit 21 and the output unit 22 correspond to the input unit 11 and the output unit 12 of the document type identifying apparatus 10 depicted in FIG. 3 or 18.

The ROM 25 stores therein in advance the document type identifying programs having the same function as the document type identifying apparatus according to the embodiments described above, namely, as depicted in FIG. 21, a word recognizing program 25a, a word information aligning program 25b, a partial keyword string generating program 25c, a word string matching program 25d, a document type determining program 25e, and a keyword selecting program 25f. As with the various components of the document type identifying apparatus 10 as depicted in FIG. 3 or 18, these programs 25a, 25b, 25c, 25d, 25e, and 25f may be appropriately integrated or distributed. The ROM 25 may be a non-volatile RAM.

The CPU 26 reads and executes these programs 25a, 25b, 25c, 25d, 25e, and 25f from the ROM 25, whereby the programs 25a, 25b, 25c, 25d, 25e, and 25f function as a word recognizing process 26a, a word information aligning process 26b, a partial keyword string generating process 26c, a word string matching process 26d, a document type determining process 26e, and a keyword selecting process 26f, respectively, as depicted in FIG. 21. The processes 26a, 26b, 26c, 26d, 26e, and 26f correspond to the word recognizing unit 14a, the word information aligning unit 14b, the partial keyword generating unit 14c, the word string matching unit 14d, the document type determining unit 14e, and the keyword selecting unit 14f of the document type identifying apparatus 10 depicted in FIG. 3 or 18.

As depicted in FIG. 21, the HDD 23 is provided with a document type identifying data table 23a. The document type identifying data table 23a corresponds to the document type identifying information database 13a depicted in FIG. 3 or 18. The CPU 26 reads a document type identifying data 24a from the document type identifying data table 23a and stores in the RAM 24, and performs the processes based on the document type identifying data 24a stored in the RAM 24.

The programs 25a, 25b, 25c, 25d, 25e, and 25f are not necessarily stored in the ROM 25 from the beginning. The programs 25a, 25b, 25c, 25d, 25e, and 25f can be stored in, for example, a portable physical medium functioning as a computer-readable storage medium, such as a flexible disk (FD), a CD-ROM, a digital versatile disk (DVD), a magneto-optical disk (MO), or an integrated circuit (IC) card that can be inserted to the computer 20, in a fixed physical medium functioning as a computer-readable storage medium, such as an HDD that is located internal or external to the computer 20, or in another computer (or server) that can be connected to the computer 20 via a public line, the Internet, a local area network (LAN), a wide area network (WAN), or the like, whereby the computer 20 reads the programs from such a medium or server and executes them. The programs 25a, 25b, 25c, 25d, 25e, and 25f can be distributed via the Internet.

According to the embodiments, the extraction is not limited to the grouped word strings corresponding to the document type identifying keywords stored in advance in the database, enabling to identify the document types with high accuracy. Even when the word string written on the document contains an error or a recognition result of the word string contains an error, the evaluation values that take into account partial matching using the partial keyword strings can be calculated, enabling to identify the document types with high accuracy.

According to the embodiments, the document types can be determined in a simple manner.

According to the embodiments, an ordered list of the possible document types can be provided to a user.

According to the embodiments, the most likely document type can be provided to a user.

According to the embodiments, the word strings can be divided to include correct words.

According to the embodiments, among the keywords stored in advance in the database, only necessary keywords can be used, enabling to reduce processing time compared with that when all keywords are processed.

According to the embodiments, the keywords for the apparently unwanted document type are excluded from the processing, enabling to reduce the processing time and the number of the processing, while identifying the document type with high accuracy.

According to the embodiments, the document type can be identified with high accuracy without reducing the evaluation value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A document type identifying method for identifying a document type of a document having word information on word strings and ruled line information on ruled lines written thereon, the document type identifying method comprising:

receiving inputs regarding the word information on the word strings and the ruled line information on the ruled lines written on the document;

storing a plurality of keywords used as keys that identify document types in a storage unit in association with each document type;

generating, for each keyword, a plurality of word-sets, which are new combinations of a plurality of words obtained by decomposing keywords consisted of a plurality of words into each word composing the keywords and further extracting a plurality of words from the each word, to be checked for matching with the word strings written on the document by using the keywords stored in the storage unit at the storing;

generating, based on the received inputs regarding the word information and the ruled line information at the receiving, grouped word strings by grouping the words written on the document and overlapping each other in terms of height when seen from a lateral direction, and aligning each of the generated grouped word strings;

checking matching of each of the grouped word strings aligned at the aligning with each of the word-sets generated at the generating, obtaining, for each of the keywords, number of matched words with a highest matching rate between each of the grouped word strings and each of the word-sets, and calculating an evaluation value for each document type by using each of the obtained number of matched words, each evaluation value evaluating a possibility of each document type to be the type of the document; and determining, based on each evaluation value calculated for each document type at the calculating, the document type of the document having the word information and the ruled line information written thereon.

2. The document type identifying method according to claim 1, wherein the determining includes determining whether each evaluation value calculated for each document type at the calculating exceeds a threshold defined for each document type to determine the document type of the document having the word information and the ruled line information written thereon.

3. The document type identifying method according to claim 1, wherein the determining includes determining whether each evaluation value calculated for each document type at the calculating exceeds a threshold defined for each document type, and ordering, when a plurality of document types correspond to evaluation values determined to exceed thresholds thereof, the document types depending on a magnitude of each evaluation value.

4. The document type identifying method according to claim 1, wherein the determining includes determining whether each evaluation value calculated for each document type at the calculating exceeds a threshold defined for the document type, and selecting, when a plurality of document types correspond to evaluation values determined to exceed thresholds thereof, a document type with a highest evaluation value.

5. The document type identifying method according to claim 1, wherein the generating the grouped word strings includes, when a ruled line is found in any of the grouped word strings based on the word information and the ruled line information, dividing the grouped word string at the ruled line.

6. The document type identifying method according to claim 1, wherein
the storing includes storing in the storage unit to-be-used or not-to-be-used information defining whether each of the keywords is available and selecting, based on the to-be-used or not-to-be-used information stored in the storage unit at the storing, a keyword that is allowed to be used from the keywords stored in the storage unit, and
the generating the word-sets includes generating the word-sets by using the keyword selected at the selecting.

7. The document type identifying method according to claim 1, wherein
the determining includes narrowing down the possible document types based on each evaluation value each time each evaluation value is calculated for each document type, and replacing a keyword among the keywords stored in the storage unit depending on the narrowed possible document types each time the possible document types are narrowed down,
the generating the word-sets includes generating the word-sets by using the modified keyword each time the keyword is replaced at the replacing, and
the checking includes checking matching of each of the grouped word strings aligned at the aligning with each of the word-sets generated at the generating to calculate each evaluation value for each document type, the evaluation values evaluating a degree of matching between word strings of each of the grouped word strings and each of the word-sets, each time the word-sets are generated.

8. The document type identifying method according to claim 1, wherein the storing includes storing the keywords having same meaning as a group in the storage unit in association with the document types, and the checking includes checking matching of each of the grouped word strings aligned at the aligning with each of the word-sets generated at the generating, extracting a keyword from the keywords in the group with the highest matching rate between the grouped word strings and the word-sets, obtaining each number of matched words for each extracted keyword, and calculating each evaluation value by using each obtained number of matched words, the evaluation values evaluating a possibility of each document type to be the type of the document.

9. A computer-readable storage medium that stores a document type identifying program for identifying a document type of a document having word information on word strings and ruled line information on ruled lines written thereon, the document type identifying program causing a computer to execute a process comprising:

receiving inputs regarding the word information on the word strings and the ruled line information on the ruled lines written on the document;

storing a plurality of keywords used as keys that identify document types in a storage unit in association with each document type;

generating, for each keyword, a plurality of word-sets, which are new combinations of a plurality of words obtained by decomposing keywords consisted of a plurality of words into each word composing the keywords and further extracting a plurality of words from the each word, to be checked for matching with the word strings written on the document by using the keywords stored in the storage unit at the storing;

generating, based on the received inputs regarding the word information and the ruled line information at the receiving, grouped word strings by grouping the words written on the document and overlapping each other in terms of height when seen from a lateral direction, and aligning each of the generated grouped word strings;

checking matching of each of the grouped word strings aligned at the aligning with each of the word-sets generated at the generating, obtaining, for each of the keywords, number of matched words with a highest matching rate between each of the grouped word strings and each of the word-sets, and calculating an evaluation value for each document type by using each of the obtained number of matched words, each evaluation value evaluating a possibility of each document type to be the type of the document; and determining, based on each evaluation value calculated for each document type at the calculating, the document type of the document having the word information and the ruled line information written thereon.

10. The computer-readable storage medium according to claim 9, wherein the determining includes determining whether each evaluation value calculated for each document type at the calculating exceeds a threshold defined for each document type to determine the document type of the document having the word information and the ruled line information written thereon.

11. The computer-readable storage medium according to claim 9, wherein the determining includes determining whether each evaluation value calculated for each document type at the calculating exceeds a threshold defined for each document type, and ordering, when a plurality of document types correspond to evaluation values determined to exceed thresholds thereof, the document types depending on a magnitude of each evaluation value.

12. The computer-readable storage medium according to claim 9, wherein the determining includes determining whether each evaluation value calculated for each document type at the calculating exceeds a threshold defined for the document type, and selecting, when a plurality of document types correspond to evaluation values determined to exceed thresholds thereof, a document type with a highest evaluation value.

13. The computer-readable storage medium according to claim 9, wherein the generating the grouped word strings includes, when a ruled line is found in any of the grouped word strings based on the word information and the ruled line information, dividing the grouped word string at the ruled line.

14. The computer-readable storage medium according to claim 9, wherein the storing includes storing in the storage unit to-be-used or not-to-be-used information defining whether each of the keywords is available and selecting, based on the to-be-used or not-to-be-used information stored in the storage unit at the storing, a keyword that is allowed to be used from the keywords stored in the storage unit, and the generating the word-sets includes generating the word-sets by using the keyword selected at the selecting.

15. The computer-readable storage medium according to claim 9, wherein the determining includes narrowing down the possible document types based on each evaluation value each time each evaluation value is calculated for each document type, and replacing a keyword among the keywords stored in the storage unit depending on the narrowed possible document types each time the possible document types are narrowed down, the generating the word-sets includes generating the word-sets by using the modified keyword each time the keyword is replaced at the replacing, and the checking includes checking matching of each of the grouped word strings aligned at the aligning with each of the word-sets generated at the generating to calculate each evaluation value for each document type, the evaluation values evaluating a degree of matching between word strings of each of the grouped word strings and each of the word-sets, each time the word-sets are generated.

16. The computer-readable storage medium according to claim 9, wherein the storing includes storing the keywords having same meaning as a group in the storage unit in association with the document types, and the checking includes checking matching of each of the grouped word strings aligned at the aligning with each of the word-sets generated at the generating, extracting a keyword from the keywords in the group with the highest matching rate between the grouped word strings and the word-sets, obtaining each number of matched words for each extracted keyword, and calculating each evaluation value by using each obtained number of matched words, the evaluation values evaluating a possibility of each document type to be the type of the document.

17. A document type identifying apparatus that identifies a document type of a document having word information on word strings and ruled line information on ruled lines written thereon, the document type identifying apparatus comprising:

an input unit that receives inputs regarding the word information on the word strings and the ruled line information on the ruled lines written on the document;

a document type identifying information storing unit that stores therein a plurality of keywords used as keys that identify document types in association with each document type;

a word-set generating unit that generates a plurality of word-sets, which are new combinations of a plurality of words obtained by decomposing keywords consisted of a plurality of words into each word composing the keywords and further extracting a plurality of words from the each word, for each keyword by using the keywords stored in the document type identifying information storing unit, the word-sets being to be checked for matching with the word strings written on the document;

a word string aligning unit that, based on the word information and the ruled line information received by the input unit, generates grouped word strings by grouping the words written on the document and overlapping each other in terms of height when seen from a lateral direction, and aligns each of the generated grouped word strings;

a word-set matching unit that checks matching of each of the grouped word strings aligned by the word string aligning unit with each of the word-sets generated by the word-set generating unit, obtains, for each of the keywords, number of matched words with a highest matching rate between each of the grouped word strings and each of the word-sets, and calculates an evaluation value for each document type by using each of the obtained number of matched words, each evaluation value evaluating a possibility of each document type to be the type of the document; and a document type determining unit that, based on each evaluation value calculated for each document type by the word-set matching unit, determines the document type of the document having the word information and the ruled line information written thereon.

18. The document type identifying apparatus according to claim 17, wherein the document type determining unit determines whether each evaluation value calculated for each document type by the word-set matching unit exceeds a threshold defined for each document type to determine the document type of the document having the word information and the ruled line information written thereon.

* * * * *